Sept. 6, 1932.   W. E. PHELAN   1,875,651
AEROFOIL SECTION
Filed May 29, 1930   2 Sheets-Sheet 1

INVENTOR.
William E. Phelan,
BY Arthur C. Brown.
ATTORNEY.

Sept. 6, 1932.  W. E. PHELAN  1,875,651
AEROFOIL SECTION
Filed May 29, 1930  2 Sheets-Sheet 2

INVENTOR.
William E. Phelan,
BY
ATTORNEY.

Patented Sept. 6, 1932

1,875,651

UNITED STATES PATENT OFFICE

WILLIAM E. PHELAN, OF KANSAS CITY, KANSAS

AEROFOIL SECTION

Application filed May 29, 1930. Serial No. 456,918.

My invention relates to aircraft construction, and more particularly to the aerofoil sections of aircraft such as wings, control surfaces and the like.

In ordinary practice, an airplane wing comprises transverse ribs and longitudinal spars comprising bars or the like connecting the ribs to form a frame, and a skin covering the frame. The spars must be constructed of relatively heavy material and must be relatively bulky to provide sufficient strength to resist torsional and bending strains and to afford suitable means for securing the ribs, whereby either the weight of a wing is increased unduly to confer required strength and rigidity, or strength is sacrificed for lightness.

Supplemental means for reinforcing a frame is sometimes provided which usually unduly increases the weight of the wing, and sometimes requires increased strength in the frame itself for permitting application of the reinforcing means.

The principal objects of my invention, therefore, are to substantially increase the strength and rigidity of aerofoil sections without increasing the weight thereof, and to provide spar-like members for connecting the ribs of a wing having extensive engagement with the ribs and the skin for stiffening the same, and to provide integral rib connecting members coextensive with the area of maximum air pressure of a sustaining surface, and providing a relatively rigid frame, thereby eliminating the usual crossbracing.

In accomplishing these and other objects of my invention, I have provided improved details of structure, the preferred form of which is illustrated in the accompanying drawings, wherein.

Figure 1:
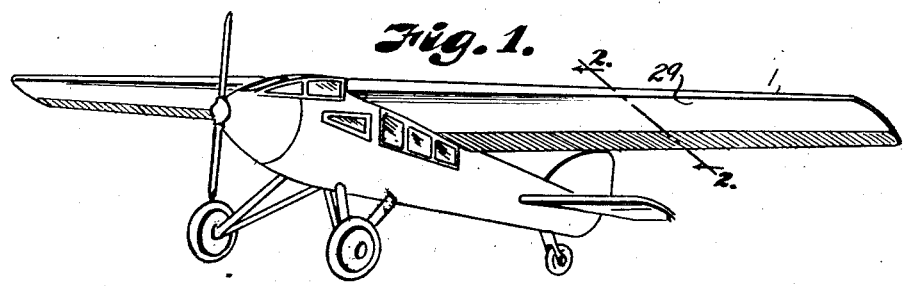
Fig. 1 is a perspective view of an airplane having aerofoil sections constructed in accordance with my invention.
Figure 2:
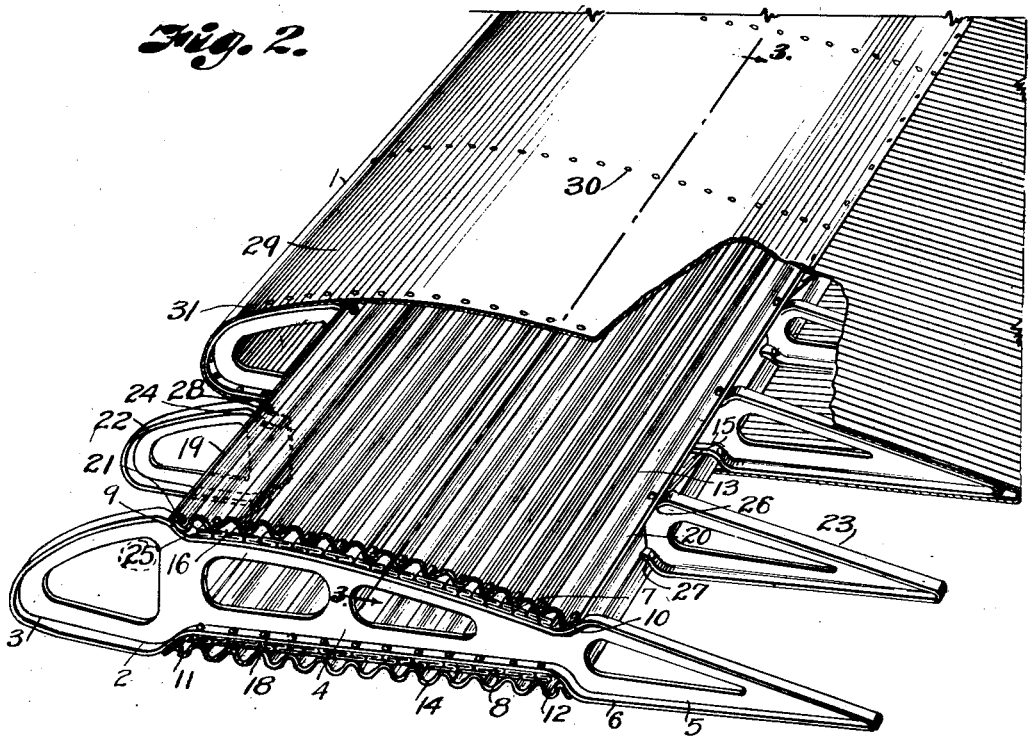
Fig. 2 is a section through a wing of the plane on the line 2—2, Fig. 1, the skin covering being partly broken away to better disclose frame construction.
Figure 3:
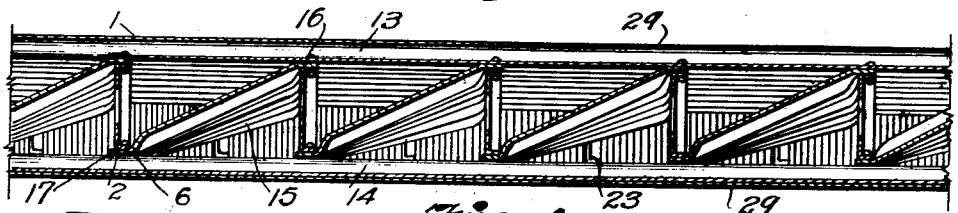
Fig. 3 is a section on the line 3—3, Fig. 2.

Referring in detail to the drawings:

1 designates generally an airplane wing including parallel spaced transverse ribs 2 including nose portions 3, body portions 4 and tail portions 5 conforming in shape to the aerodynamic form of the wing, and each rib being preferably formed of sheet metal plates having lightening holes for reducing the weight, each having a laterally extending edge flange 6 to stiffen the web and provide surfaces for attaching the frame members presently described.

The upper and lower flanges of the body portion of the ribs are inset across the center of air pressure on the wing section to provide upper and lower seats 7 and 8 terminating at their ends in inclined shoulders 9—10, and 11—12, respectively.

Received in the seats and extending across the ribs are upper and lower longitudinal frame members 13 and 14 comprising corrugated sheet metal plates with their corrugations extending crosswise of the ribs and longitudinally of the plates.

The corrugated plates thus overlie the upper and lower edges of the body portions of the ribs, and extend substantially over the entire area covering the maximum air pressure on the wings to reinforce the skin covering and at the same time perform the functions of the usual spars.

Figure 4:
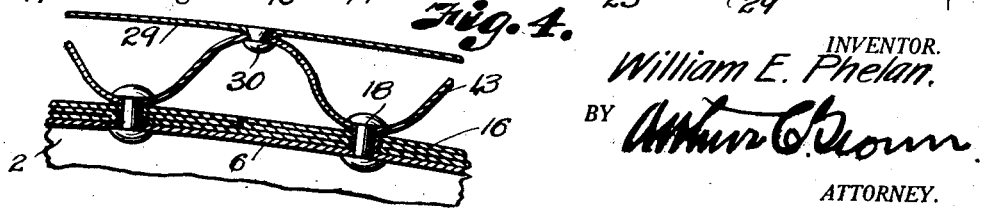
Fig. 4 is an enlarged fragmentary section showing the upper edge of a rib, a longitudinal frame plate and the skin attached to the frame plate.

I further preferably install diagonal bracing comprising longitudinal corrugated reinforcing plates 15 between adjacent ribs, the end edge of one plate having its corrugations flattened and the flattened portions being bent to form end flanges 16 for interposition between the upper frame plate 13 and the upper edge of a rib, and the opposite end of the reinforcing plate being flattened and bent in the opposite direction to form a flange 17 overlying the under edge of the body of the next adjacent rib. The parts are retained preferably by rivets 18 which are extended through the plates 13 and 14 through the ends of the diagonal brace plates and through the flanges of the ribs, as best illustrated in Fig. 4.

Attention is called to the fact that the rivets may be inserted in the trough corrugations of the frame plates and pass through the downpressed crowns of the reinforcing plates, whereby the latter are securely clamped between the frame plates and the flanges of the ribs and the heads of the rivets are recessed in the troughs of the frame plates.

The side edges 19 and 20 of the longitudinal plates are preferably inclined upwardly to rest on the inclined shoulders of the seats, and are secured thereto by rivets 21 passing through the flanges similar to the rivets 18.

By using the corrugated plates thus described I am enabled to space the ribs a maximum distance, and in order to support the covering intermediate the ribs at the front and back edges of the wing I prefer to insert rib sections 22 and 23 conforming in shape to the head and tail portions of the ribs, and each having shoulder portions 24 and 25, and 26 and 27, respectively, forming seats for the edge flanges 19 and 20 of the frame plates which may be secured thereto by rivets 28 extending in the latterally projecting edge flanges of said members.

The ribs connected by the longitudinal frame plates and the fragmentary rib-like members 22 and 23, connected to the plates, form a frame over which a skin 29 may be spread to cover and entirely enclose the frame and which may be secured thereto by rivets 30 and 31 extending respectively in the frame plates and the flanges of the ribs, as best shown in Fig. 4.

Figure 5:
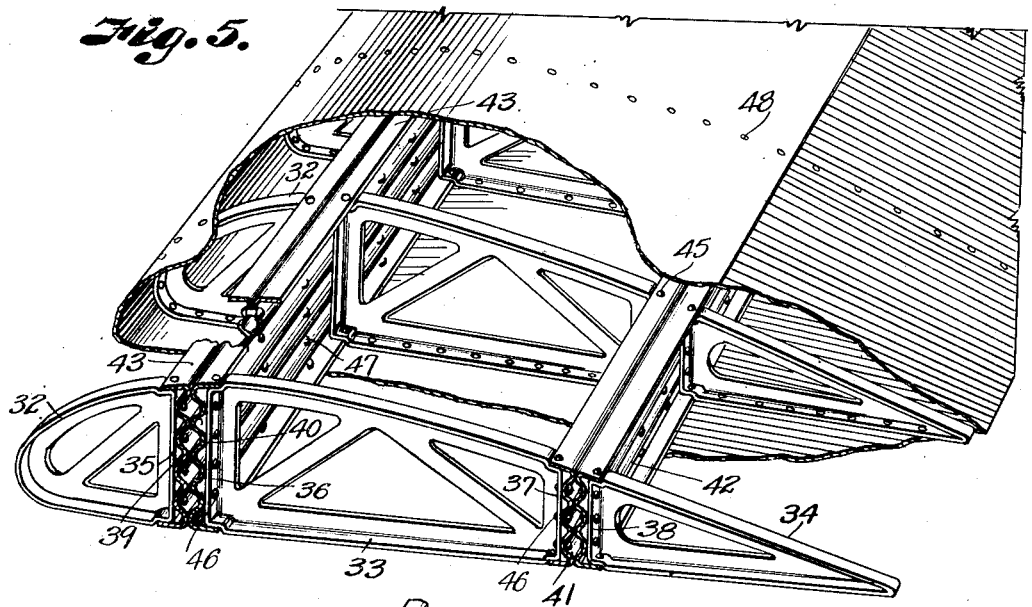
Fig. 5 is a fragmentary perspective view of a portion of an airplane wing illustrating a modified form of wing section, the skin being broken away to show the interior construction.
Figure 6:
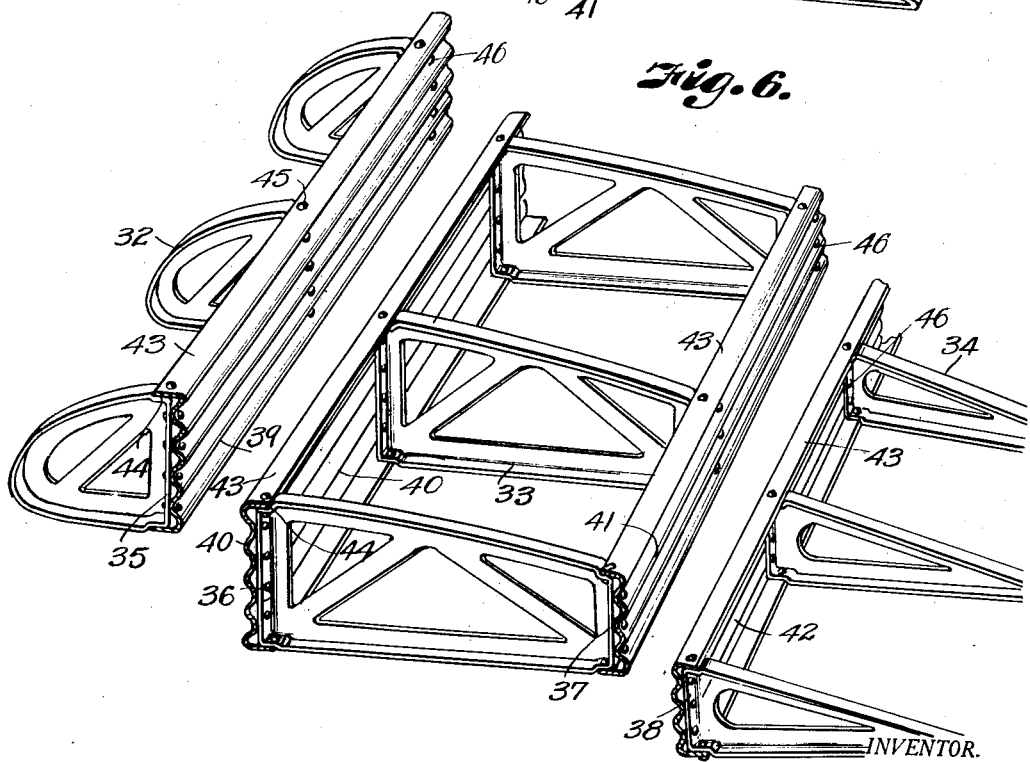
Fig. 6 is a perspective view of the component sections of the frame illustrated in Fig. 5 and shown in spaced relation.

In a modified form of construction illustrated in Figs. 5 and 6 the corrugated plates which I provide to replace the spars in airplane construction are associated with ribs and skin reinforcing members comprising nose portions 32, body portions 33, and tail portions 34 having edge flanges similar to those described above in connection with the preferred construction. Said flanges, however, extend completely around the edges of the webs, particularly to provide seating flanges 35, 36, 37 and 38 on the adjacent vertical edges of juxtaposed members, and frame plates are provided in pairs whereby plates 39 and 40 may be secured respectively to the rear edges of the nose members 32 and the front end edges of the bodies 33, and plates 41 and 42 may be secured respectively to the rear end edges of the bodies 33 and the front end edges of the tail members 34, as illustrated particularly in Fig. 6.

Longitudinal edge flanges 43 of the plates are bent into planes and formed with sufficient width to seat on depressed shoulders 44 formed at the corners of the several members, the plate flanges being secured to the members by rivets 45 and the intermediate portions of the plates being secured to the vertical edges of said members by rivets 46, said rivets extending in the flanges of the members.

The nose members secured to the longitudinal truss-like plate 39, the body members secured to the plates 40 and 41, and the tail members secured to the plate 42 thus form separate units of a wing frame. The units are connected by locating the nose unit in abutting relation with the front end of the body unit preferably with the crowns of the corrugations of the face to face engaged plates in registry, and riveting the pair of plates together by rivets 47 extending through said crowns whereby distortion of the corrugated plates by the connecting means is avoided, and relatively rigid attachment of the plates is effected.

The tail unit is similarly secured to the body unit and the skin may then be mounted, and secured to the frame by rivets 48 extending in the flanges of the rib members.

An aerofoil constructed as described, in the form shown in Figs. 1 to 4, will have a high degree of strength and rigidity to resist either torsional strains or bending strains due both to the corrugated character of the steel plates connecting the ribs and to the fact that the plates are connected to a considerable extent of the ribs and overlie the entire body portions of the ribs. It is apparent that no braces or reinforcements extending angularly laterally from one rib to another are required, since the wide plates take up strains exerted transversely of the wing.

The truss-like corrugated plates connecting adjacent ribs further reinforce the frame and also not only take up lateral strains but offer relatively great resistance to torsional strains.

In the form of construction illustrated in Figs. 5 and 6 the bending and torsional strains are similarly absorbed due to the corrugated character of the plurality of longitudinal plates.

Attention is called to the fact that not only may the longitudinal plate have torsional weight much less than the weight of the ordinary spar but that the ribs, and means for attaching the longitudinal members to the ribs may have much less total weight than the same elements in wings provided with the ordinary spars, but that the means ordinarily required to provide braces and stiffeners may be partly or wholly eliminated without sacrifice of safety. Further, an increase of all the qualities desired in an aerofoil is attained, and avoidance of many of the objectionable structural features of such devices including a multiplicity of bolts, wires, rods and the like, likely to get out of order, break, stretch, or fail to function when most necessary.

What I claim and desire to secure by Letters Patent is:

1. In airplane construction, a wing comprising transverse ribs including head and tail portions longitudinally extending corrugated plates having longitudinal edge flanges, and fasteners in said flanges engaged with said portions for connecting the ribs.

2. An aerofoil comprising transverse integral ribs, sectional rib members between the integral ribs, and longitudinally extending corrugated plates having longitudinal edges fixed to said sectional rib members and end edges fixed to said integral ribs.

3. In airplane construction, an aerofoil including parallel spaced transverse ribs, means connecting the ribs to form a frame and corrugated plates extending from the upper edge of one rib to the lower edge of the adjacent rib for reinforcing the frame.

4. In an aerofoil, a frame including longitudinal upper and lower plates forming a spar, and a transverse rib-like member having a seat to receive one edge of said plates, and means for securing said edge to the seat.

5. In an aerofoil, a supporting member comprising juxtaposed plates having longitudinally extending corrugations, and laterally extending flanges on the edges of the plates, and rib members having seats fixed to said flanges.

6. In an aerofoil, a supporting member comprising juxtaposed plates having longitudinally extending corrugations and laterally extending flanges on the edges of the plates, and rib members having flanged portions fixed to said plate flanges for securing the plates together.

7. In an aerofoil, a rib member having an edge flange and a depressed portion including said flange forming a seat, a spar-like frame member comprising a corrugated plate having a longitudinal edge flange mounted on said seat, and a fastener mounted in said flanges for connecting the plate to the rib member.

8. In an aerofoil, a rib including separate nose and tail members, each having shoulders at the upper and lower corners of one end thereof, spars comprising plates having longitudinal corrugations and provided with longitudinal edge flanges seated on said shoulders, and means for attaching said flanges to said shoulders.

9. An aerofoil comprising spaced parallel ribs having integral nose, body and tail portions, corrugated plates having ends attached respectively to the upper and lower edges of said ribs to connect the same and covering the area of air pressure on the aerofoil, and intermediate ribs including separate nose and tail members secured to said plates.

10. An aerofoil including parallel spaced ribs having upper and lower edges provided with depressed portions forming seats, upper and lower plates provided with longitudinal edge flanges and having ends mounted on said seats, intermediate ribs comprising nose and tail members having shoulders to receive said plate flanges, and means for securing the plates to the ribs.

11. In an aerofoil, a rib comprising separate nose, body and tail members, and spars comprising longitudinally corrugated plates fixed respectively to opposite ends of the body member and to the inner ends of the nose and tail members, and means for securing adjacent plates together to connect the nose and tail members to the body member.

12. In an aerofoil, a nose section comprising nose rib members and a corrugated plate fixed to the inner vertical edges of said members, a body section comprising body rib members and corrugated plates fixed to the opposite vertical end edges of said members, a tail section comprising tail rib members and a corrugated plate fixed to the inner vertical end edge of said members, and means securing the plates of the nose and tail sections to the plates of the body section.

13. An aerofoil including a body section comprising spaced rib members and a plate fixed to the front end edge of said members and having longitudinal corrugations, and a nose section comprising spaced rib members and a plate fixed to the rear end edge of said members and having longitudinal corrugations having crowns engaging the crowns of corrugations of the first named plate, and means mounted in said engaged crowns for securing the nose section to the body section.

14. In an aerofoil, a pair of sections each comprising rib members and a corrugated plate fixed to similar ends of the rib members, the crowns of corrugations of one of said plates engaging the crowns of corrugations of the other of said plates, and means for securing the sections together.

15. An aerofoil including a pair of parallel spaced ribs, upper and lower plates fixed respectively to the upper and lower edges of said ribs for spacing the plates and connecting the ribs, and a reinforcement including a plate having an upper edge fixed to the upper edge portion of one of said ribs and a lower edge fixed to the lower edge of the other of said ribs.

16. In an aerofoil including spaced ribs and upper and lower corrugated plates fixed respectively to the upper and lower edges of said ribs for spacing the plates and connecting the ribs, corrugated plates having upper and lower end flanges interposed respectively between said upper and lower plates and the corresponding edges of the ribs and fixed to said ribs for reinforcing the aerofoil.

17. In a device of the character described, an aerofoil frame including sectional nose and tail members, a corrugated plate having longitudinal edge flanges overlying and fixed to corresponding ends of the members of each section for connecting the same.

In testimony whereof I affix my signature.

WILLIAM E. PHELAN.